(No Model.)
P. WHITE.
TRAP FOR BASINS AND SINKS.
No. 357,804. Patented Feb. 15, 1887.
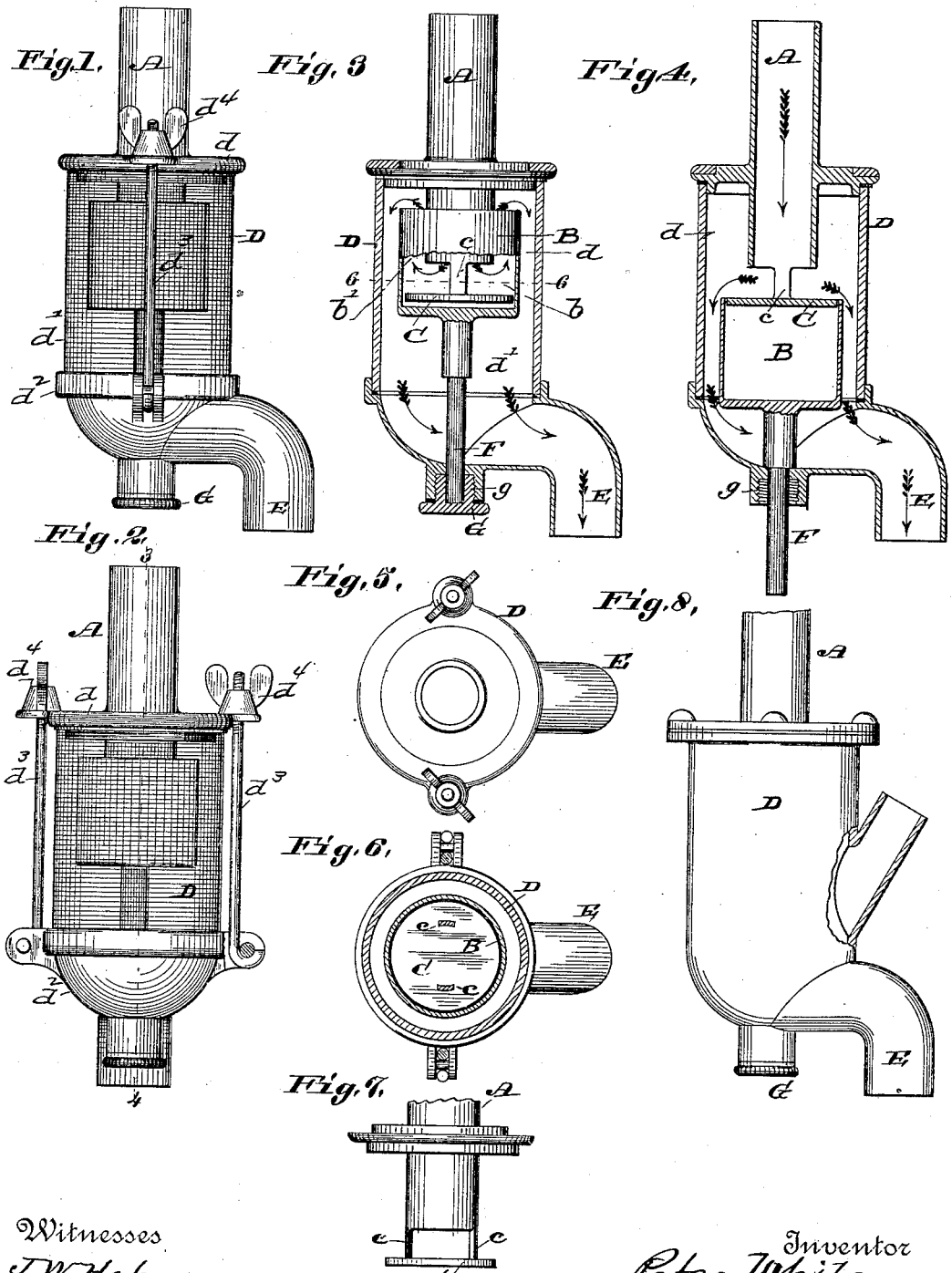

UNITED STATES PATENT OFFICE.

PETER WHITE, OF ST. LOUIS, MISSOURI.

TRAP FOR BASINS AND SINKS.

SPECIFICATION forming part of Letters Patent No. 357,804, dated February 15, 1887.

Application filed July 19, 1886. Serial No. 208,401. (No model.)

*To all whom it may concern:*

Be it known that I, PETER WHITE, of St. Louis, Missouri, have made a new and useful Improvement in Traps for Basins and Sinks, of which the following is a full, clear, and exact description.

These advantages characterize the present trap: It cannot well be emptied by siphonic action—something apt to occur in many forms of traps—but when it is desired to remove the solid matter which is liable to collect in basin and sink traps the operation can be readily and efficiently performed.

The most desirable mode of carrying out the improvement is shown in the annexed drawings, making part of this specification, in which—

Figure 1 is a side elevation of the trap. Fig. 2 is an elevation at right angles to that of Fig. 1. Fig. 3 is a vertical section on the line 3 4 of Fig. 2, the parts being as when the trap is in use. Fig. 4 is a similar section on the line 3 4 of Fig. 2, the parts being as when the trap is being cleaned. Fig. 5 is a plan of the trap. Fig. 6 is a horizontal section on the line 6 6 of Fig. 3. Fig. 7 is a side elevation, looking in a direction at right angles to that of Fig. 3, of the interior, upper, or stationary portion of the trap; and Fig. 8 is an elevation similar to that of Fig. 1, but showing a ventilating-pipe attached to the trap.

The same letters of reference denote the same parts.

A represents the passage through which the contents of the basin or sink are drained into the trap. They pass from the passage A into the cup B, which surrounds the lower end of the passage or pipe A, inclosing a space, $b$, immediately below the pipe A, and an annular space, $b'$, around the lower end of the pipe A. A disk-shaped plate, C, by means of the connections $c\ c$, is secured to the pipe A, but sufficiently beneath it to provide suitable openings for the drainage from the pipe into the cup. The disk C is fitted to the interior of the cup, and when the various parts of the trap are relatively adjusted for use the disk is at or near the bottom of the cup, as shown in Fig. 3.

The parts already described are contained in a casing, D, inclosing an annular space, $d$, around the cup B, with which the cup-space $b'$ communicates, and extending downward at $d'$ beneath the cup, and ultimately communicating with the escape E. The cup B is supported within the casing by means of the stem F, which passes downward through the bottom of the casing and is stepped in the nut G, which is adapted to be screwed into the casing at $g$. The cup and stem remain thus upheld in the position of Fig. 3 until it is desired to clean the trap, whereupon, by unscrewing the nut G and drawing the cup downward into the position of Fig. 4, the disk C, carrying the solid matter which is to be removed from the trap, is relatively brought to the top of the cup, in which position, and by means of a downward delivery of water through the pipe A, the matter can be washed from off the disk and discharged into the escape E. The cup, by raising the stem F and reapplying the nut G, is then replaced in its original position.

The liquid contents cannot be drawn out of the cup by reason of siphonic action, for whenever the liquid in the cup is lowered to the level of the lower end of the pipe A the action referred to ceases.

The casing D and the cup B may, as indicated in Figs. 1, 2, be of glass, to render them transparent. The casing may be furnished with a ventilating-pipe, H, Fig. 8, and the trap may be made to take apart by making the casing-top $d$ and body $d'$ separable from each other and from the casing bottom $d^2$, and adapting the parts named to be held together by means of the rods $d^3$ and nuts $d^4$, as indicated in Figs. 1, 2.

I claim—

The combination of the pipe A, the disk C, the cup B, the vertically-adjustable stem F, and the casing D, substantially as described, and for the purpose set forth.

Witness my hand.

PETER WHITE.

Witnesses:
C. D. MOODY,
FRANCIS VALLÉ.